UNITED STATES PATENT OFFICE.

WILLIAM H. EMERICK, OF NEAR HAMILTON, OHIO.

HOG-CHOLERA REMEDY.

SPECIFICATION forming part of Letters Patent No. 233,083, dated October 12, 1880.

Application filed June 25, 1880. (No specimen.)

*To all whom it may concern:*

Be it known that I, WILLIAM H. EMERICK, a citizen of the United States, residing near Hamilton, in the county of Butler, State of Ohio, have invented a new and useful composition of matter to be used as a specific for the disease of the hog known as "cholera," of which the following is a specification.

My compound consists of the following ingredients combined in the proportions, viz: pure oil-cake meal, (flax,) twenty parts; sulphur, four parts; carbonate of iron, four parts; cream of tartar, four parts; asafetida, four parts; resin, four parts; Cayenne pepper, one part; these ingredients to be thoroughly mixed by pulverizing and sifting.

In using the above-named compound it should be mixed with middlings or coarse flour. One tea-spoonful of the powder given three times each day is a dose for grown hogs. Small pigs must be fed with the compound mixed in milk and middlings.

By the use of the above composition healthy hogs thrive and take on flesh faster. It also cures and prevents hogs from taking the disease known as "hog-cholera."

What I claim, and desire to secure by Letters Patent of the United States, is—

The herein-described composition of matter to be used for preventing and curing the disease of the hog commonly known as "hog-cholera," consisting of oil-cake meal, sulphur, resin, asafetida, cream of tartar, Cayenne pepper, and carbonate of iron, in the proportions specified.

WILLIAM H. EMERICK.

Witnesses:
ROBT. M. PECK,
E. A. BELDEN.